Patented Dec. 26, 1950

2,535,857

UNITED STATES PATENT OFFICE 2,535,857

2-MERCAPTO-3,6-DIHYDROPYRIMIDINE-3-MONOCARBOXYLIC ACIDS AND ESTERS OF THESE ACIDS

Roger A. Mathes and Floyd D. Stewart, Akron, Ohio, assignors to The B. F. Goodrich Company, New York, N. Y., a corporation of New York No Drawing. Application September 13, 1949, Serial No. 115,556

13 Claims. (Cl. 260—256.5)

This invention relates to new and useful organic compounds and pertains particularly to certain 2-mercapto-3,6-dihydropyrimidine-3-monocarboxylic acids and their esters. This invention also contemplates the method of preparing these new compounds.

The compounds of this invention are 2-mercapto-3,6-dihydropyrimidine-3-monocarboxylic acids and esters having the formula

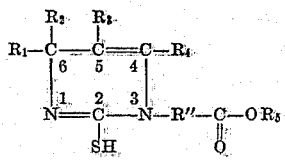

where $R_1$, $R_2$, $R_3$ and $R_5$ are hydrogen or a hydrocarbon radical, $R_4$ is a hydrocarbon radical, and $R''$ is a divalent hydrocarbon radical. These new compounds are useful intermediates in the synthesis of organic chemical compounds, are also useful in pesticidal compositions, and are useful as retarders of the vulcanization of rubbery materials.

These 3-substituted 2-mercapto-3,6-dihydropyrimidines can be easily and conveniently prepared by reacting an amino acid or an ester of an amino acid with a ketone having a hydrogen atom in the alpha position and a thiocyano group in the beta position to the keto group and being otherwise composed exclusively of carbon and hydrogen atoms (such ketones being hereinafter referred to as beta-thiocyano ketones). During this reaction water is split out, ring closure occurs, the 3-substituted mercapto pyrimidine compound precipitates and is easily obtained in excellent yields.

The above reaction may be represented by the following generic equation:

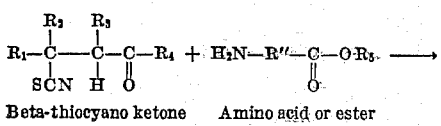
Beta-thiocyano ketone    Amino acid or ester

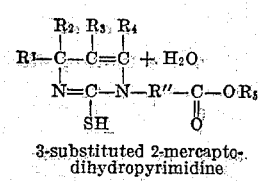
3-substituted 2-mercapto-dihydropyrimidine where $R_1$, $R_2$, $R_3$, $R_4$, $R_5$ and $R''$ have the significance as stated above.

Any desired beta-thiocyano ketone having the formula as represented in the above reaction equation may be used to prepare the 3-substituted 2-mercapto-dihydropyrimidines of this invention by the process of this invention. Thus, any or all of $R_1$, $R_2$, $R_3$ may be hydrogen or any hydrocarbon radical including alkyl, alkenyl, cycloalkyl, aryl, aralkyl and alkaryl radicals as well as other radicals composed exclusively of carbon and hydrogen. Similarly, $R_4$ may be any of these hydrocarbon radicals. Beta-thiocyano ketones of this class may be prepared by the reaction of an unsaturated ketone having an olefinic double bond in the alpha-beta position with respect to the keto group, with nascent thiocyanic acid formed by the interaction of a non-oxidizing mineral acid, such as dilute sulfuric acid or hydrochloric acid, with ammonium thiocyanate or an alkali metal thiocyanate. For example, when such alpha-beta unsaturated ketones as mesityl oxide, phorone, butylidene acetone, heptylidene acetone, 5-methyl-4-heptene-one-3,5-ethyl-3 heptene-one-2, 5-ethyl-3-nonene-one-2,3-methyl-4-ethyl-3 hexene-one-2, vinyl methyl ketone, vinyl ethyl ketone, acrylophenone, phenyl vinyl ketone, chalcone, acrylonaphthone, benzilidene acetone, 4-phenyl-3 butene-one-2, styryl n-hexyl ketone, among others are reacted with thiocyanic acid, the HSCN adds to the double bond of these alpha-beta unsaturated ketones. The resulting products are the beta-thiocyano ketones which are the reactants employed in the process of this invention to prepare the 3-substituted 2-mercaptopyrimidines of this invention. The preferred beta-thiocyano ketones for use in this invention are those which possess the formula set forth above wherein each of $R_1$, $R_2$ and $R_3$ is hydrogen or an alkyl radical containing from 1 to 6 carbon atoms and $R_4$ is a similar alkyl radical. A typical beta-thiocyano ketone is 4-methyl-4-thiocyanopentan-2-one prepared by the addition of HSCN to mesityl oxide.

The other reactant employed in the process of this invention may be any amino acid or hydrocarbon ester of an amino acid having the formula as hereinbefore set forth. Hence, any amino acid or ester of an amino acid whose components other than the nitrogen of the amino group and the oxygen in the carboxy group of the acid and in the COOR group of the ester are exclusively carbon and hydrogen atoms. Thus, the amino compounds are composed of one nitrogen atom connected to a carbon atom, two oxygen atoms both connected to a carbon atom different than the one to which the nitrogen is attached and are otherwise composed exclusively of carbon and hydrogen atoms.

Examples of such compounds are such amino acids as glycine, alpha-alanine, beta-alanine, amino sec.-butyl acetic acid (isoleucine) 4-aminobutyric acid, 1-amino butyric acid, 2-amino butyric acid, 2-amino-1,1 diethyl butyric acid, 1-amino 2,2-dimethyl butyric acid, 3-amino-2,3-diphenyl butyric acid, 1-amino-1-ethyl butyric acid, 1-amino 1-methyl butyric acid (isovaline), 1-amino-1-phenyl butyric acid, 3-(o-aminophenyl) butyric acid, 1-amino caproic acid, 4-amino caproic acid, 5-amino-2,4-dimethyl caproic acid, 5-amino caproic acid, 2-amino-2-methyl caproic acid, 5-amino-3-methyl caproic acid, 1-amino caprylic acid, 5-amino-3,4,4-trimethyl caprylic acid, 1-amino capric acid, 2-amino capric acid, alpha-amino cyclohexaneacetic acid, 4-amino cyclohexaneacetic acid, 2-amino cyclohexanecarboxylic acid, p-amino benzoic acid, 3-amino-4-ethyl-benzoic acid, p-(2-aminopropyl) benzoic acid, p-(2-aminoethyl) benzoic acid, p-(3-aminopropyl) benzoic acid, m-aminobenzoic acid, m-(p-aminophenyl) benzoic acid, 4-amino-2-phenyl benzoic acid, o-(p-aminophenyl) benzoic acid, anthranilic acid, 3,5-dimethyl anthranilic acid, 3,6-dimethyl anthranilic acid, 5-phenyl anthranilic acid, 3-amino-2-anthroic acid, 2-amino-1-naphthoic acid, 3-amino-1-naphthoic acid, 6-amino-1-naphthoic acid, 8-amino-1-naphthoic acid, 2-amino-5,6,7,8-terahydronaphthoic acid, 4-amino-5,6,7,8-tetrahydronaphthoic acid, 1-amino-2-naphthoic acid, 3-amino-2-naphthoic acid, 1-amino-3-methyl-2-naphthoic acid, 1-amino-6-methyl-2-naphthoic acid, 1-amino-7-methyl naphthoic acid, 1-amino-5,6,7,8-tetrahydronaphthoic acid and 3-amino-5,6,7,8-tetrahydronaphthoic acid. The esters of these amino acids which are useful reactants in preparing these new 3-substituted-2-mercaptopyrimidines include the alkyl esters such as the methyl, ethyl, isopropyl and isobutyl esters; the cycloalkyl esters such as the cyclohexyl esters; the aryl esters such as the phenyl and naphthyl esters; and the aralkyl esters such as the benzyl and phenethyl esters.

In carrying out the preparation of these 2-mercaptopyrimidine 3-monocarboxylic acids and esters, the reactants are brought together in any desired manner. Preferably, the reactants are stirred together in the presence of an inert reaction diluent. Such solvents or diluents as water, ether, benzene, alcohol and hexane among others are suitable reaction diluents. It is not necessary or critical to employ a reaction diluent where either or both reactants are liquid at about room temperature, for the desired reaction will take place when the reactants are merely combined and heated as herein described. But the use of a diluent facilitates processing and hence is desirable.

In general, heating the reaction mixture to a temperature of about 100° C. in most cases is desirable. When the reaction is carried out at atmospheric pressure, maintaining the reaction temperature in the range of 50° C. to 100° C. will give the best results. But the reaction will begin at room temperature or below with a spontaneous rise in temperature because of the exothermic nature of the reaction. The pressure at which the reaction is carried out may be varied as desired, but, in general, it will be found that the reaction is most conveniently carried out at atmospheric pressure. In this case standard acid-resistant reaction equipment is used.

It is also preferred to carry out the reaction in an acidic reaction medium. This may be accomplished by adding to the reaction mixture when necessary a small amount of mineral acid such as sulfuric acid or hydrochloric acid as a dilute solution; that is, about a 0.01 molar solution of the acid. Under these conditions, the reaction and the subsequent ring closure takes place more rapidly than when the reaction medium is neutral or basic. It is not critical that the reaction medium be acidic, for the reaction and ring closure will take place when the medium is neutral. When crude beta-thiocyano ketone is obtained by the reaction hereinbefore described, it is sufficiently acid so that the addition of an acid or acidic material is not necessary to obtain the most desirable rate of reaction. Hence, when purified beta-thiocyano ketone, one which has been washed free of acidic materials, is used, it is not sufficiently acidic to cause the reaction to progress at the most desirable rate and some acidic material must be employed to achieve the optimum reaction rate.

The following specific examples are merely illustrative of our invention and are not intended to be a limitation thereon. It will be apparent that the precise proportions of materials employed may be varied as desired in keeping with best operational technique. In each of the examples, the parts are by weight.

EXAMPLE I

A mixture containing 18.7 parts of glycine (amino acetic acid), 39.3 parts of (crude) 4-methyl-4-thiocyanopentan-2-one and 125 parts of water was heated for six hours at 85° S. to 90° C. A crystalline solid precipitated during the reaction. The reaction mixture was allowed to cool to room temperature and the solid was then recovered by filtration. In this manner, 31 parts of 2-mercapto-4,6,6-trimethyl-3,6-dihydropyrimidine-3-acetic acid were recovered. This compound when purified by recrystallizing from alcohol had a melting point of 175° C. to 176° C. A chemical analysis of this compound gave the following composition which is in agreement with the calculated composition for the named compound.

*Percent composition*

| Found | Calculated |
|---|---|
| C 50.47<br>H 6.59<br>N 13.06<br>S 15.03<br>M. W. 210 | C 50.47<br>H 6.55<br>N 13.08<br>S 14.95<br>M. W. 214 |

Accordingly, this compound has the formula:

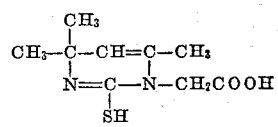

EXAMPLE II

A mixture containing 22.25 parts of beta-alanine (beta aminopropionic acid), 39.2 parts of crude 4-methyl-4-thiocyanopentan-2-one and 125 parts of water was heated for about six hours at about 90° C. A crystalline solid precipitated during the reaction. The reaction mixture was allowed to cool to room temperature, and the precipitate was then recovered by filtration. In this manner 29.5 parts of this solid identified as 2 - mercapto - 4,6,6-trimethyl-3,6-dihydropyrimidine-3-beta-propionic acid were recovered. When this product was purified by recrystallizing from benzene, this purified product had a melting point of 142° C. to 143° C. and was a white crystalline material. The chemical analysis of the purified product gave the following composition which is in close agreement with the composition calculated for the named product:

*Percent composition*

| Found | Calculated |
|---|---|
| C 52.71 | C 52.61 |
| H 7.00 | H 7.06 |
| N 12.15 | N 12.27 |

Accordingly, this compound has the formula:

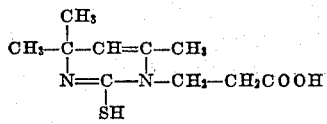

EXAMPLE III

A mixture containing 22.25 parts of dl-alpha-alanine, 39.3 parts of crude 4-methyl-4-thiocyanopentan-2-one and 125 parts of water was heated for six hours at 85° C. to 90° C. A crystalline product formed during the reaction. After the reaction mixture had cooled to room temperature, the solid product was recovered by filtration. In this manner 21.5 parts of the product identified as 2-mercapto-4,6,6-trimethyl-3,6-dihydropyrimidine 3-alpha propionic acid were recovered having a melting point after subsequent recrystallization from benzene of 191° C. to 192° C. The chemical composition determined by chemical analysis of this compound is in agreement with that for the compound named.

*Percent composition*

| By Analysis | Calculated |
|---|---|
| C 52.60 | C 52.61 |
| H 7.09 | H 7.06 |
| N 12.24 | N 12.27 |

Accordingly, this compound has the formula:

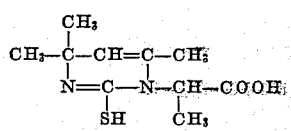

EXAMPLE IV

A mixture containing 125 parts of water, 34.25 parts of anthranilic acid and 39.3 parts of 4-methyl-4-thiocyanopentan-2-one were heated for about six hours at about 90° C. A crystalline precipitate formed during the reaction. This precipitate was recovered by filtration. In this manner 41 parts of this product identified as 2-mercapto-4,6,6-trimethyl-3,6-dihydropyrimidine - 3 - ortho benzoic acid were recovered. This product when recrystallized from chloroform had a melting point at 210° C. and had a chemical composition as follows which is in agreement with that calculated for the named product.

*Percent composition*

| By Analysis | Calculated |
|---|---|
| C 60.84 | C 60.85 |
| H 5.86 | H 5.84 |
| N 10.08 | N 10.12 |
| S 11.60 | S 11.60 |

Accordingly, this compound has the formula:

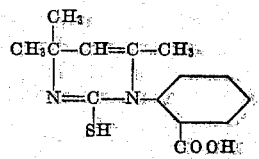

EXAMPLE V

A mixture containing 125 parts of water, 34.25 parts of p-amino benzoic acid and 39.3 parts of 4-methyl-4-thiocyanopentan-2-one was heated for about six hours at about 90° C. During the reaction a crystalline precipitate formed which was recovered by filtration. In this manner 46.2 parts of 2-mercapto-4,6,6-trimethyl-3,6-dihydropyrimideni - 3 - p - benzoic acid were recovered which when recrystallized from chloroform, had a melting point of 209° C. to 210° C. This product had a chemical composition as determined by analysis thta was in close agreement with the calculated chemical composition of the named composition as shown below.

*Percent composition*

| By Analysis | Calculated |
|---|---|
| C 60.59 | C 60.86 |
| H 5.80 | H 5.84 |
| N 10.02 | N 10.12 |

Accordingly, the product has the following formula:

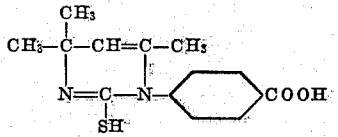

EXAMPLE VI

2 - mercapto-4,6,6-trimethyl - 3,6 - dihydropyrimidine-3-o-methylbenzoate was prepared by heating to 95° C. a stirred mixture containing 39.3 parts of purified 4-methyl-4-thiocyanopentan-2-one, 37.8 parts of methyl anthranilate, 125 parts of water and 2 parts of dilute sulfuric acid (about 0.01 molar solution). During two hours of heating a crystalline precipitate formed. When this resulting mixture had cooled to room temperature, it was a pasty mass. This pasty mass was filtered and washed with hexane. The filtrate contained some unreacted thiocyano ketone indicating that the reaction was not complete. This was probably the cause of the pasty condition of the product. There was obtained 45 grams of a buff colored solid material which on purification was a colorless crystalline material melting at 185° C. to 186° C. A chemical analysis of this purified compound gave the following composition which is in agreement with the calculated composition of the desired product.

*Percent composition*

| | By Analysis | Calculated |
|---|---|---|
| C | 62.03 | 62.04 |
| H | 6.21 | 6.25 |
| N | 9.37 | 9.65 |

EXAMPLES VII TO XIII

The examples which follow illustrate the use of beta-thiocyano ketones other than 4-methyl-4-thiocyano-2-one in preparing 2-mercapto-3,6-dihydropyrimidine-3-monocarboxylic acids. In each of the following examples glycine (aminoacetic acid) is used as a reactant with these other thiocyano ketones in order to simplify the illustrations. It will be understood that any of the other amino acids hereinbefore set forth can also be used. The reactants used and the products obtained are as follows:

Having disclosed our invention by way of specific examples which are intended merely as illustrations and are not intended as limitations of our invention, we do not desire or intend to limit ourselves solely thereto; for, as hitherto stated, the proportions of the materials utilized as well as the reaction conditions may be varied and chemically equivalent compounds may be used, if desired, without departing from the spirit and scope of our invention as defined in the appended claims.

We claim:
1. A compound having the formula:

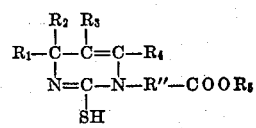

where $R_1$, $R_2$, $R_3$ and $R_5$ are members selected from the group consisting of hydrogen and mono-

| Example | Beta Thiocyano Ketone Used | Product |
|---|---|---|
| VII | (C₂H₅)₂—CH—CH—CH₂—C(=O)—CH₃ with SCN on second CH<br>5-ethyl-4-thiocyanoheptan-2-one<br>(From 5 ethyl-3-heptene-2-one+HSCN) | (C₂H₅)₂—CH—C—CH=C—CH₃ with N=C—N—CH₂COOH, SH<br>2-mercapto-4-methyl-6-(1-ethylpropyl)-3,6-dihydropyrimidine-3-acetic acid |
| VIII | C₄H₉—CH—CH—CH₂—C(=O)—CH₃ with C₂H₅ and SCN substituents<br>5-ethyl-4-thiocyanononan-2-one<br>(From 5-ethyl-3-nonene-2-one+HSCN) | C₄H₉—CH—CH—CH=C—CH₃ with C₂H₅, N=C—N—CH₂OOH, SH<br>2-mercapto-4-methyl-6-(1-ethyl amyl)-3,6-dihydropyrimidine-3-acetic acid |
| IX | C₅H₁₁—CH—CH₂—C(=O)—CH₃ with SCN<br>4-thiocyano-nonan-2-one<br>(From 3-nonene-2-one+HSCN) | C₅H₁₁—CH—CH=C—CH₃ with N=C—N—CH₂COOH, SH<br>2-mercapto-4-methyl-6-amyl-3,6-dihydropyrimidine-3-acetic acid |
| X | C₃H₇—CH—CH₂—C(=O)—CH₃ with SCN<br>4-thiocyano-heptan-2-one<br>(From butylidene acetone+HSCN) | C₃H₇—CH—CH=C—CH₃ with N=C—N—CH₂COOH, SH<br>2-mercapto-4-methyl-6-propyl-3,6-dihydropyrimidine-3-acetic acid |
| XI | CH₂—CH₂—C(=O)—CH₃ with SCN<br>4-thiocyano-butan-2-one<br>(From vinyl methyl ketone+HSCN) | CH₂—CH=C—CH₃ with N=C—N—CH₂COOH, SH<br>2-mercapto-4-methyl-3,6-dihydropyrimidine-3-acetic acid |
| XII | CH₂—CH₂—C(=O)—C₂H₅ with SCN<br>5-thiocyano-heptan-3-one<br>(From vinyl ethyl ketone+HSCN) | CH₂—CH=C—C₂H₅ with N=C—N—CH₂COOH, SH<br>2-mercapto-4-ethyl-3,6-dihydropyrimidine-3-acetic acid |
| XIII | Ph—CH—CH₂—C(=O)—C₄H₉ with SCN<br>2-phenyl-2-thiocyanoethyl butyl ketone<br>(From styryl n-butyl keton+HSCN) | Ph—CH—CH=C—C₄H₉ with N=C—N—CH₂COOH, SH<br>2-mercapto-4-n-butyl-6-p-phenyl-3,6-dihydropyrimidine-3-acetic acid | valent saturated aliphatic hydrocarbon and monovalent aromatic hydrocarbon radicals, R₄ is a hydrocarbon radical selected from the group consisting of monovalent saturated aliphatic hydrocarbon and monovalent aromatic hydrocarbon radicals and R'' is a divalent hydrocarbon radical selected from the group consisting of divalent saturated aliphatic hydrocarbon and divalent aromatic hydrocarbon radicals.

2. A compound having the formula:

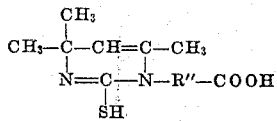

where R'' is a divalent saturated aliphatic hydrocarbon radical.

3. A compound having the formula:

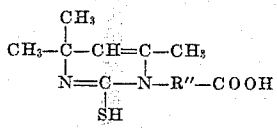

where R'' is a divalent aromatic hydrocarbon radical.

4. 2-mercapto - 4,6,6 - trimethyl - 3,6-dihydropyrimidine-3-acetic acid having the formula:

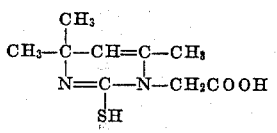

5. 2-mercapto - 4,6,6 - trimethyl - 3,6-dihydropyrimidine-3-beta-propionic acid of the formula:

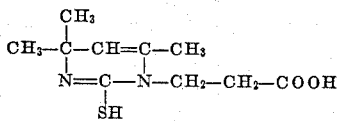

6. 2-mercapto - 4,6,6 - trimethyl - 3,6-dihydropyrimidine-3-p-benzoic acid having the formula:

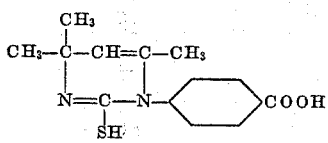

7. 2-mercapto - 4,6,6 - trimethyl - 3,6-dihydropyrimidine-3-o-methylbenzoate having the formula:

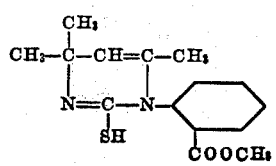

8. The process which comprises reacting a beta-thiocyano ketone of the formula

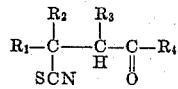

wherein R₁, R₂, R₃ are members selected from the group consisting of hydrogen and monovalent saturated aliphatic hydrocarbon and monovalent aromatic hydrocarbon radicals and R₄ is a radical selected from the group consisting of monovalent saturated aliphatic hydrocarbon and monovalent aromatic hydrocarbon radicals, with a compound of the formula

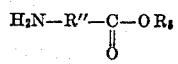

wherein R'' is a radical selected from the group consisting of divalent saturated aliphatic hydrocarbon radicals and divalent aromatic hydrocarbon radicals and R₅ is a member selected from the group consisting of hydrogen and monovalent saturated aliphatic hydrocarbon and monovalent aromatic hydrocarbon radicals, thereby to produce a compound of the formula

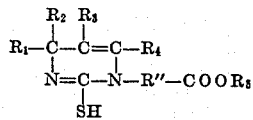

wherein R₁, R₂, R₃, R₄, R₅ and R'' have the same meaning as set forth hereinabove.

9. The process of claim 8 wherein the reaction is effected in an acidic aqueous medium.

10. The process of preparing 2-mercapto-4,6,6-trimethyl - 3,6 - dihydropyrimidine-3-acetic acid which comprises reacting glycine with 4-methyl-4-thiocyanopentan-2-one.

11. The process of preparing 2-mercapto-4,6,6-trimethyl-3,6-dihydropyrimidine - 3-beta-propionic acid which comprises reacting beta-alanine with 4-methyl-thiocyanopentan-2-one.

12. The process of preparing 2-mercapto-4,6,6-trimethyl - 3,6 - dihydropyrimidine - 3-p-benzoic acid which comprises reacting 4-methyl-4-thiocyanopentan-2-one with p-amino benzoic acid.

13. The process of preparing 2-mercapto-4,6,6-trimethyl-3,6-dihydropyrimidine - 3 - o - methyl benzoate which comprises reacting methyl anthranilate with 4-methyl-4-thiocyanopentan-2-one.

ROGER A. MATHES.
FLOYD D. STEWART.

No references cited.